United States Patent Office 3,425,412
Patented Feb. 4, 1969

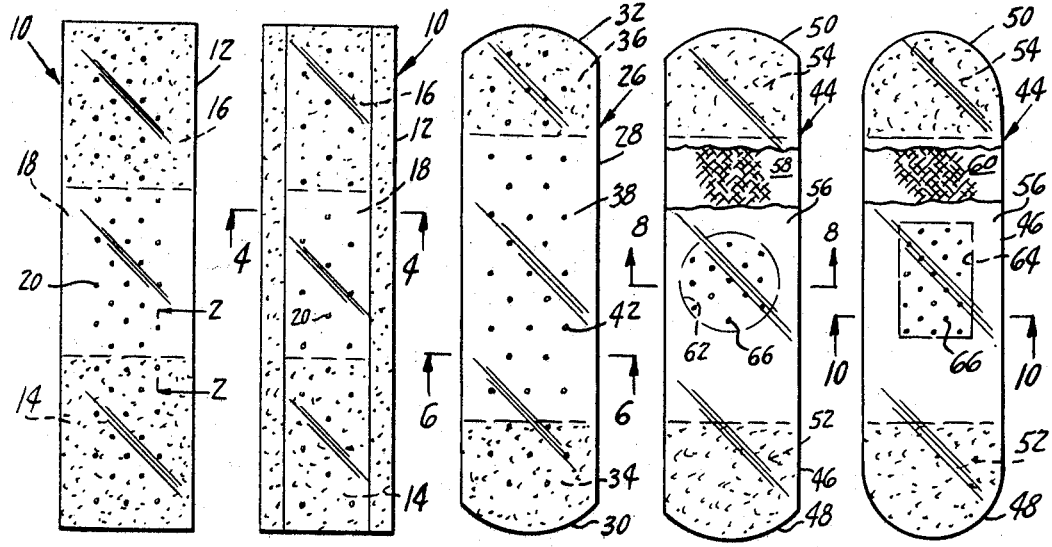
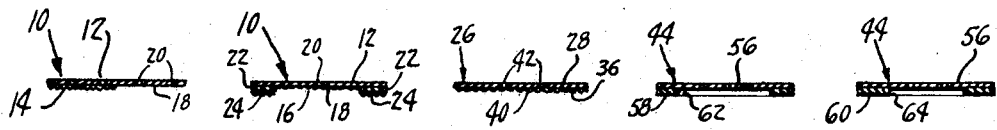
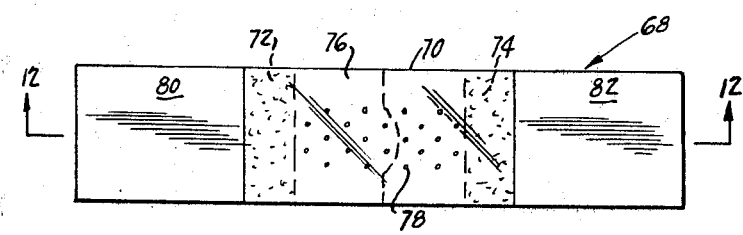
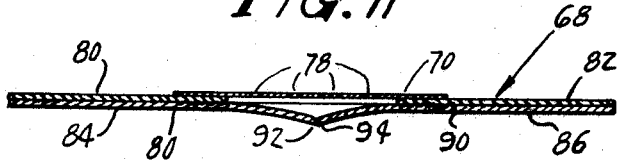

3,425,412
TRANSPARENT BANDAGE
Richard A. Pope, Belton, Tex.
(Box 1201, Garland, Tex. 75040)
Filed May 20, 1966, Ser. No. 551,622
U.S. Cl. 128—156   3 Claims
Int. Cl. A61l *15/01;* A61f *13/02;* A61b *19/00*

ABSTRACT OF THE DISCLOSURE

A laminated bandage to permit the observation of a wound without removal of the bandage from the body of the wearer and comprising a strip of transparent material have a central perforated or apertured portion extending the entire width of the strip, and adhesive means on a pair of remotely disposed ends of the strip and on a common side thereof to secure the strip on the body of the wearer.

---

This invention relates to bandages of the type used to cover wounds such as scratches, eruptions, abrasions and the like, and more particularly to a bandage having a transparent central portion whereby the wound may be readily viewed throughout the healing process.

It is known in the prior art to provide bandages equipped with means for viewing the covered wound. The bandages of the prior art seem to fall into three categories, those which include a transparent segment through which the wound is viewed exemplified by U.S. Patents 1,956,695, 2,221,758 and 2,273,873, those in which one or more openings are continuously uncovered exemplified by Patent 3,086,531, and those providing one or more openings which may be selectively covered and uncovered exemplified by Patents 1,610,089, 2,148,882 and 2,273,873.

The bandages of the prior art that fall into the first category, i.e. those having a transparent portion through which an individual may view the wound, are generally relatively complex devices having a plurality of lamina arranged to raise the transparent sheet from above the wound. One of the disadvantages of the prior art transparent bandages is the cost of making the bandage in mass quantities. Another disadvantage of the multilayered bandages of the prior art is that they tend to become rather thick structures causing inconvenience by their sheer bulk.

It is accordingly an object of the instant invention to provide a transparent bandage through which the healing process of a wound may be observed.

Another object of the instant invention is to provide a transparent bandage which is extremely simple and inexpensive to manufacture and which may be made from a single lamina of material.

Still another object of the instant invention is to provide a bandage having a transparent central portion for viewing the healing processes of a wound comprised of a strip of non-opaque material carrying an adhesive layer on each end of the strip, thereby leaving a non-adhesive portion in the center for juxtaposition to the wound.

A further object of the instant invention is to provide a transparent bandage carrying a guaze strip at the wound engaging portion thereof which may be apertured to facilitate viewing therethrough.

Other objects and advantages of the instant invention reside in the combinations of elements, arrangements of parts, and features of construction and utilization, all as will be more fully pointed out hereinafter and disclosed in the accompanying drawing wherein there is shown a preferred embodiment of this inventive concept.

In the drawing:
FIGURE 1 is top plan view of a bandage made in accordance with the principles of the instant invention;

FIGURE 2 is a partial longitudinal cross-sectional view of the bandage of FIGURE 1 illustrating the adhesive carrying and adhesive free portions thereof, FIGURE 2 being taken substantially on the line 2—2 of FIGURE 1, looking in the direction of the arrows;

FIGURE 3 is a top plan view of the bandage of the instant invention affixed on a pair of parallel adhesive strips thereby raising the bandage from the underlying surface;

FIGURE 4 is a transverse cross-sectional view of the bandage of FIGURE 3 taken substantially along line 4—4 thereof as viewed in the direction indicated by the arrows;

FIGURE 5 is a top plan view of another embodiment of the transparent bandage of the instant invention equipped with a centermost gauze strip for abutting the wound area and acting in much the same manner as a conventional bandage;

FIGURE 6 is a transverse cross-sectional view of the bandage of FIGURE 5 taken substantially along line 6—6 thereof as viewed in the direction indicated by the arrows;

FIGURE 7 is a top plan view of still another form of the instant invention illustrating a bandage equipped with a centered gauze portion, the gauze portion forming an aperture so that the individual may view the healing progress of the wound through the transparent segment of the bandage, certain parts being broken away for clarity of illustrations;

FIGURE 8 is a transverse cross-sectional view of the bandage of FIGURE 7 taken substantially along line 8—8 thereof as viewed in the direction indicated by the arrows;

FIGURE 9 is still another embodiment of the transparent bandage of the instant invention similar in nature to the embodiment of FIGURE 7 equipped with a centermost gauze portion forming an aperture cooperating with the transparent uppermost layer of the bandage providing means for viewing the underlying wound;

FIGURE 10 is a transverse cross-sectional view of the bandage of FIGURE 9 taken substantially along line 10—10 thereof as viewed in the direction indicated by the arrows;

FIGURE 11 is a top plan view of another form of transparent bandage of the instant invention illustrating a centermost transparent portion bounded on either end by a opaque adhesive carrying portion thereby providing a central transparent segment through which the wound may be viewed; and FIGURE 12 is a longitudinal cross-sectional view of the embodiment of FIGURE 11 illustrating in particular the removable tabs covering the adhesively layered segments.

Referring now to the drawing in detail, wherein like reference characters designate like elements throughout the several views thereof, and particularly to the embodiments of FIGURES 1 to 4 inclusive, there is shown generally at 10 the transparent bandage of the instant invention comprising a strip or lamina of non-opaque material 12, by which is meant material that is either transparent or translucent to an extent sufficient to view the surface underlying strip 12 and may be rubber latex, a cellulosic ester such as cellulose acetate, polyethylene, polyvinyl chloride, polyethylene terphthalate, polyvinylidene chloride, polyethyl acrylate, or any other transparent substance. An adhesive layer 14, 16 is applied to the ends of strip 12 leaving a non-adhesive portion 18 in the center of strip 12 for overlying the wound. Strip 12 is preferably provided with a plurality of apertures 20 extending at least throughout non-adhesive portion 18, thereby allowing circulation of air to the wound.

It will be readily apparent that non-adhesive portion 18 will overlie the wound and will not adhere thereto during the healing process. In addition air circulates through apertures 20 with any seepage of the wound escaping through apertures 20 or from the lateral sides of non-adhesive portion 18. It should be pointed out that non-adhesive portion 18 extends throughout the width of lamina 12 and corresponds in size generally to the gauze pad on an ordinary bandage.

The embodiment of FIGURES 3 and 4 is illustrated as carrying a pair of adhesive tape strips 22 carrying an adhesive layer 24 thereon for securing strips 22 to the underlying surface. The uppermost layer of strip 22 may also carry an adhesive layer although it has been found that adhesive layers 14, 16 are sufficient to secure lamina 12 to strips 22. It will be apparent that strips 22 will raise non-adhesive portion 18 out of contact with the underlying wound while adhesive layers 14, 16 may be pressed into engagement with the underlying skin to substantially seal off the wound.

Referring now to the embodiment of FIGURES 5 and 6, another form of bandage is illustrated generally at 27 comprising a lamina of transparent material 28 of the type previously described having arcuate longitudinal edges 30, 32 in the manner that ordinary band-aids are made. Lamina 28 carries a pair of adhesive layers 34, 36 adjacent each longitudinal edge leaving a non-adhesive portion 38 at the center. A gauze pad 40 is affixed to non-adhesive portion 38 in any suitable manner, as by overlapping gauze portion 40 with adhesive layers 34, 36. Lamina 28 is provided with a plurality of spaced apertures 42 extending along at least that portion of lamina 28 overlying gauze portion 40.

Referring now to the embodiments of FIGURES 7 to 10 inclusive, another form of transparent bandage of the instant invention is illustrated generally at 44 comprising a single lamina of transparent material 46 having arcuate longitudinal edges 48, 50 similar to the embodiment of FIGURE 5. Lamina 44 carries an adhesive layer 52, 54 adjacent each longitudinal end 48, 50 forming a non-adhesive portion 56 between adhesive layers 52, 54. A gauze strip 58, 60 underlies non-adhesive portion 56, 58 and forms a central opening 62, 64 illustrated respectively as a circle and a rectangle, although any suitable shaped opening will suffice, centrally positioned under non-adhesive portion 56 for surrounding the wound which is visible through non-adhesive portion 56. Lamina 46 is apertured as at 66, covering at least the portion above central openings 62, 64 allowing the wound to breathe.

Referring now to FIGURES 11 and 12, another form of transparent bandage is illustrated generally at 68 comprised of a transparent lamina 70 of the type previously described carrying a pair of spaced apart adhesive layers 72, 74 forming a non-adhesive portion 76 at the center of lamina 70. Lamina 70 forms a plurality of apertures 78 extending along at least a part of non-adhesive portion 76 allowing the underlying wound to bleed. A pair of opaque strips 80, 82 are respectively fixed to adhesive layers 72, 74 and extend along the longitudinal dimension of bandage 68. Each of strips 80, 82 carries an adhesive layer 84, 86 to secure bandage 68 to the patient's skin with a pair of tabs 88, 90 being temporarily affixed to strips 80, 82 in a conventional manner. Tabs 88, 90 form the customary removing tips 92, 94 so that tabs 88, 90 may be readily removed.

It should be noted that the adhesive utilized to secure the transparent lamina to the skin may be either transparent or opaque although a transparent adhesive is preferred to allow further inspection of the area adjacent the wound.

It is now seen that there is herein provided an improved transparent bandage which accomplishes all of the objects and advantages of the instant invention and others, including many advantages of great practical utility and commercial importance.

Since many embodiments may be made of the instant inventive concept, and since many modifications may be made in the embodiments hereinbefore shown and described, it is understood that the foregoing is to be interpreted merely as illustrative and not in a limiting sense.

I claim:
1. A laminated bandage covering an external skin wound to permit the observation thereof without removing said bandage from the body of the wearer and comprising, in combination:
   an elongated first lamina formed of a transparent material and including a central portion transparent throughout its width and length for juxtaposition over the wound to afford visual inspection thereof, and a pair of remotely disposed integrally connected ends;
   said central portion of said first lamina benig provided with a plurality of spaced apertures extending transversely therethrough;
   second lamina comprising
   adhesive means on and coextensive with the area of each of said remotely, disposed ends, respectively, of said first lamina, and on a common side thereof to releasably secure said bandage on the user's skin remotely of said wound.
2. The bandage of claim 1 and further including
   a third lamina comprising a gauze strip affixed to said common side of said first lamina and being coextensive with its said central portion, said strip having an opening extending transversely therethrough circumscribing said wound to permit observation thereof through said central portion of said first lamina.
3. The bandage of claim 1 and further including
   third lamina comprising an elongated strip of adhesive tape affixed, respectively, to each longitudinally extending marginal edge of said first lamina on said common side and throughout the entire length thereof to space said central portion of said first lamina from said wound.

References Cited
UNITED STATES PATENTS

| | | | |
|---|---|---|---|
| 1,956,695 | 5/1934 | Reinitz | 128—155 |
| 2,273,873 | 2/1942 | Klein | 128—151 |
| 2,387,593 | 10/1945 | Lesser | 128—157 X |
| 2,399,545 | 4/1946 | Davis | 128—156 |
| 2,367,690 | 1/1945 | Purdy | 138—132 |
| 2,898,910 | 8/1959 | Gross et al. | 138—156 |
| 3,037,507 | 6/1962 | Melges | 128—133 |

ADELE M. EAGER, *Primary Examiner.*

U.S. Cl. X.R.

128—132; 128—154; 206—059